(12) United States Patent
Dally

(10) Patent No.: US 6,266,379 B1
(45) Date of Patent: Jul. 24, 2001

(54) DIGITAL TRANSMITTER WITH EQUALIZATION

(75) Inventor: William J. Dally, Stanford, CA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 08/882,252

(22) Filed: Jun. 25, 1997

Related U.S. Application Data

(63) Continuation of application No. 08/880,980, filed on Jun. 23, 1997, now abandoned.
(60) Provisional application No. 60/050,098, filed on Jun. 20, 1997.

(51) Int. Cl.[7] ....................................................... H03H 7/30

(52) U.S. Cl. ........................ 375/296; 375/229; 333/28 R

(58) Field of Search ................................... 375/266, 285, 375/229, 233, 296; 333/28 R

(56) References Cited

U.S. PATENT DOCUMENTS

| | | | |
|---|---|---|---|
| 3,777,130 | 12/1973 | Crosier et al. | 235/152 |
| 3,906,400 | 9/1975 | Gooding et al. | 332/11 |
| 3,914,588 | 10/1975 | Nussbaumer | 235/156 |
| 3,987,288 | 10/1976 | Franks | 235/152 |
| 4,374,426 | 2/1983 | Burlage et al. | 364/724 |
| 4,556,983 | 12/1985 | Heitmann et al. | 375/60 |
| 4,797,898 | * 1/1989 | Martinez | 375/219 |
| 4,849,957 | 7/1989 | Suzuki | 369/59 |
| 5,119,402 | 6/1992 | Ginzburg et al. | 375/17 |
| 5,412,691 | * 5/1995 | Ginzburg et al. | 375/296 |
| 5,418,670 | 5/1995 | McClure et al. | 360/131 |
| 5,521,946 | * 5/1996 | Main | 375/350 |
| 5,608,757 | 3/1997 | Smith et al. | 375/229 |

OTHER PUBLICATIONS

National Semiconductor Product Folder, "CLC014, Adaptive Cable Equalizer for High Speed Data Recovery," Feb. 26, 1997, pp. 1–3.

National Semiconductor Product Folder, "Comlinear CLC014, Adaptive Cable Equalizer for High–speed Data Recovery," Aug. 1996, pp. 1–12.

De Man, Hugo J. et al., "High–Speed NMOS Circuits for ROM–Accumulator and Multiplier TYpe Digital Filters," IEEE Journal of Solid–State Circuits, vol. SC–13, No. 5, Oct. 1978, pp. 565–572.

Fledler, Alan, et al., "PF 15.1: A 1.0625Gbps Transceiver with 2x–Oversampling and Transmit signal Pre–Emphasis," IEEE International Solid–State Circuits Conference, Feb. 7, 1997, pp. 238–239.

Schröder, Hartmut, "High Word–Rate Digital Filters with Programmable Table Look–up," IEEE Transactions on Circuits and Systems, May 1977, pp. 277–279.

Dally, William J. et al., "Transmitter Equalization for 4–Gbps Signaling," IEEE Micro, vol. 17, No. 1, Jan./Feb. 1997, pp. 48–56.

\* cited by examiner

Primary Examiner—Temesghen Ghebretinsae
(74) Attorney, Agent, or Firm—Hamilton, Brook, Smith & Reynolds, P.C.

(57) ABSTRACT

An equalizer provided in a digital transmitter compensates for attenuation in a signal channel to a digital receiver. The equalizer generates signal levels as a logical function of bit history to emphasize transition signal levels relative to repeated signal levels. The preferred equalizer includes an FIR transition filter using a look-up table. Parallel circuits including FIR filters and digital-to-analog converters provide a high speed equalizer with lower speed circuitry. The equalizer is particularly suited to in-cabinet and local area network transmissions where feedback circuitry facilitates adaptive training of the equalizer.

41 Claims, 8 Drawing Sheets

DIGITAL TRANSMITTER WITH EQUALIZATION

RELATED APPLICATION

This is a Continuation of a Continuation-In-Part Application Ser. No. 08/880,980 filed Jun. 23, 1997 entitled DIGITAL TRANSMITTER WITH EQUALIZATION by William J. Dally, which also claims priority to U.S. Provisional Application No. 60/050,098 filed Jun. 20, 1997 entitled EQUALIZED CMOS SIGNALING by William J. Dally, the teachings of which are incorporated herein by reference in their entirety.

GOVERNMENT SUPPORT

This invention was supported, in whole or in part, by Air Force Contract F19628-92-C-0045. The Government has certain rights in the invention.

BACKGROUND OF THE INVENTION

The performance of many digital systems is limited by the interconnection bandwidth between chips, boards, and cabinets. As VLSI technology continues to scale, system bandwidth will become an even more significant bottleneck as the number of I/Os scales more slowly than the bandwidth demands of on-chip logic. Also, off-chip signalling rates have historically scaled more slowly than on-chip clock rates. Most digital systems today use full-swing unterminated signalling methods that are unsuited for data rates over 100 MHz on one meter wires. Even good current-mode signalling methods with matched terminations and carefully controlled line and connector impedance are limited to about 1 GHz by the frequency-dependent attenuation of copper lines. Without new approaches to high-speed signalling, bandwidth will stop scaling with technology when we reach these limits.

SUMMARY OF THE INVENTION

Conventional approaches to dealing with frequency dependent attenuation on transmission lines have been based on equalization, either in the transmitter or the receiver. For example, Tomlinson preceding is used in modems, and digital equalization in binary communication channels has been suggested in U.S. Pat. No. 4,374,426 to Burlage et al. However, such systems cannot scale to very high data rate binary or multilevel systems having bandwidths extending from near DC to greater than 100 MHz. Above 100 MHz, there is substantial attenuation due to skin effect resistance on conventional transmission lines.

The present invention enables equalizers which can be implemented as digital filters operating at acceptable clock speeds. For example, a three gigabit per second (Gbps) system can be implemented using 400 Mbps circuitry. The invention has particular application to nonmodulated, high data rate, binary or multilevel systems as found locally within a data processor cabinet or on a local area network.

In accordance with the present invention, a digital transmitter comprises an equalizer which emphasizes transition signal levels relative to repeated signal levels. In particular, a novel equalizer generates signal levels as a logical function of bit history to emphasize transition signal levels. Preferred implementations define the logical function of bit history in a look up table.

In preferred embodiments, the equalizer converts an input signal, having discrete signal levels at an input data rate, to an output signal having a greater number of discrete signal levels at the input data rate. In particular, the equalizer generates transmitted signal levels based on time since last signal transition. A particularly simple implementation is based on whether a current bit is equal to an immediately previous bit.

The clock rates of circuitry can be reduced by multiplexing outputs of parallel logic circuits operating on different multiple bit inputs to generate the signal levels. In an adaptive system, the level of equalization in the transmitter can be modified as a function of signals detected at the receiver.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

The density and speed of modern VLSI technology can be applied to overcome the I/O bottleneck they have created by building sophisticated I/O circuitry that compensates for the characteristics of the physical interconnect and cancels dominant sources of timing and voltage noise. Such optimized I/O circuitry is capable of achieving I/O rates an order of magnitude higher than those commonly used today while operating at lower power levels.

A system embodying the invention can achieve a four Gbps signaling rate using 0.5 μm CMOS circuits by controlling and compensating for characteristics of the transmission medium, by cancelling timing skew, and through careful management of time and voltage noise.

Figure 1:
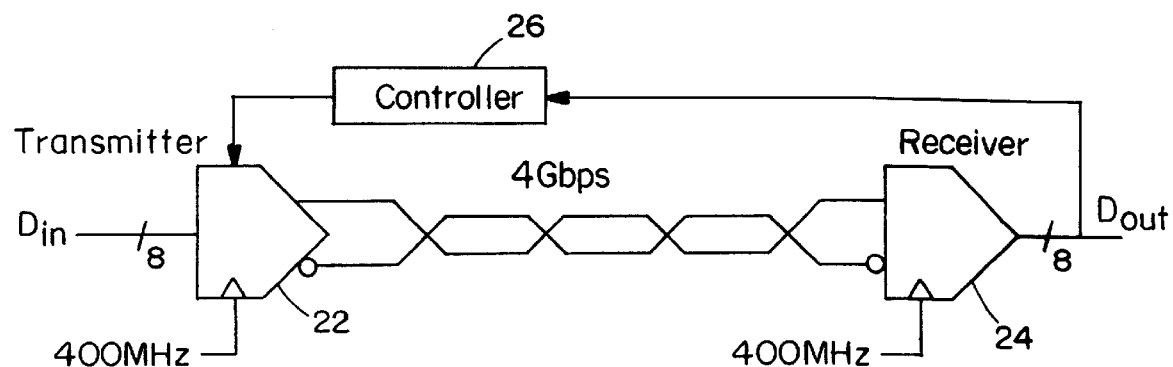
FIG. 1 illustrates a digital communication system embodying in the present invention.

FIG. 1 shows one channel of high-speed signalling system embodying the invention. A transmitter module 22 accepts 8-bit parallel data at 400 MHz. Each byte is coded into 10 bits for band-limiting and forward error correction and transmitted up to 3 m across a single differential transmission line. The transmitter pre-emphasizes the signal to compensate for expected line characteristics. The lossy transmission line as well as package and connector parasitics attenuate and distort the received waveform, and it is further corrupted by noise coupled from adjacent lines and the power supply. The receiver 24 accepts this noisy, distorted signal and its own 400 MHz clock. The receiver generates 4 GHz timing signals aligned to the received data, samples the noisy signal, decodes the signal, and produces synchronous 8-bit data out.

The availability of 4 Gbps electrical signalling will enable the design of low-cost, high-bandwidth digital systems. The wide, slow buses around which many contemporary digital systems are organized can be replaced by point-to-point networks using a single, or at most a few, high-speed serial channels resulting in significant reduction in chip and module pinouts and in power dissipation. A network based on 400 MBytes/s serial channels, for example, has several times the bandwidth of a 133 MBytes/s PCI-bus that requires about 80 lines. Also, depending on its topology, the network permits several simultaneous transfers to take place at full rate. A group of eight parallel channels would provide sufficient bandwidth (3.2 GBytes/s) for the CPU to memory connection of today's fastest processors. For modest distances (up to 30 m with 18 AWG wire), high-speed electrical signalling is an attractive alternative to optical communication in terms of cost, power, and board area for peripheral connection and building-sized local-area networks.

Frequency-Dependent Attenuation Causes Intersymbol Interference

Skin-effect resistance causes the attenuation of a conventional transmission line to increase with frequency. With a broadband signal, as typically used in digital systems, the superposition of unattenuated low-frequency signal components with attenuated high-frequency signal components causes intersymbol interference that degrades noise margins and reduces the maximum frequency at which the system can operate.

Figure 2A:
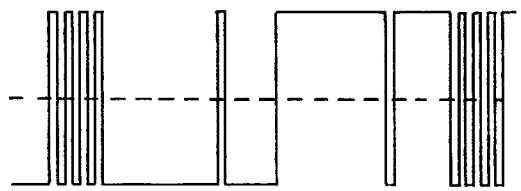
FIGS. 2A and 2B illustrate a sample binary pulse train and the resultant frequency dependent attenuation caused by a transmission line.
Figure 2B:
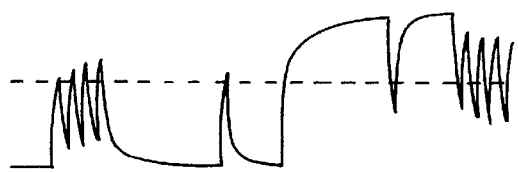
Figure 3A:
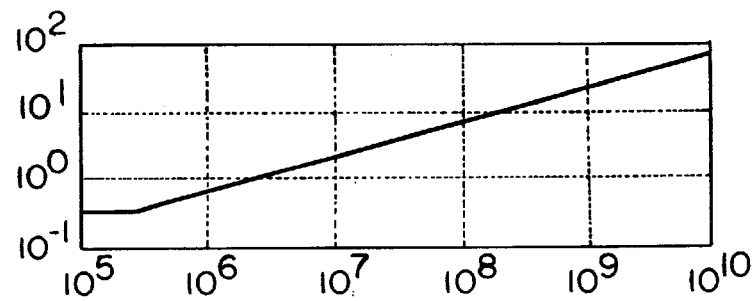
FIGS. 3A and 3B illustrate the resistance and attenuation curves for one meter of 30 AWG, 100 ohm twisted pair transmission line.
Figure 3B:
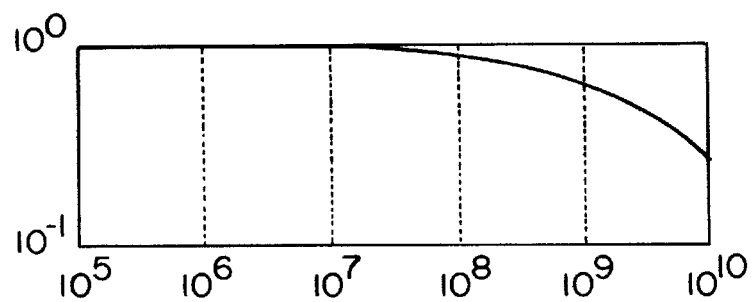
Figure 3C:
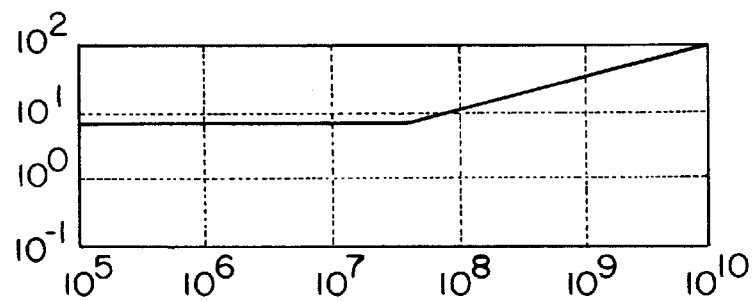
FIGS. 3C and 3D illustrate the resistance and attenuation curves for one meter of 5 mil 0.5 oz 50 ohm strip guide.
Figure 3D:
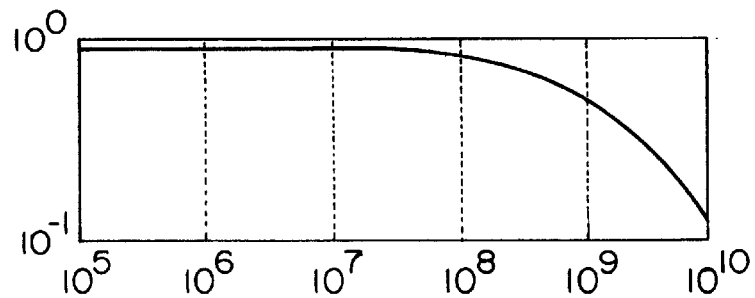

This effect is most pronounced in the case of a single 1 (0) in a field of 0s (1s) as illustrated in FIGS. 2A and B. The figures show a 4 Gb/s signal (FIG. 2A) and the simulated result of passing this signal across 3 m of 24 AWG twisted pair (FIG. 2B). The highest frequency of interest (2 GHz) is attenuated by −7.6 dB (42%). The unattenuated low-frequency component of the signal causes the isolated high-frequency pulse to barely reach the midpoint of the signal swing giving no eye opening in a differential system and very little probability of correct detection.

The problem here is not the magnitude of the attenuation, but rather the interference caused by the frequency-dependent nature of the attenuation. The high-frequency pulse has sufficient amplitude at the receiver for proper detection. It is the offset of the pulse from the receiver threshold by low-frequency interference that causes the problem. Later, we will see how using a transmitter equalizer to preemphasize the high-frequency components of the signal eliminates this problem. However, first we will characterize the nature of this attenuation in more detail.

FIGS. 3A–D show the resistance per meter and the attenuation per meter as a function of frequency for a 30 AWG (d=128 mm) twisted pair with a differential impedance of 100 ohms (FIGS. 3A and 3B) and for a 5 mil (d=125 mm) half-ounce (0.7 mil thick) 50 omhs (FIGS. 3C and 3D) stripguide. For the 30 AWG pair, the skin effect begins increasing resistance at 267 KHz and results in an attenuation to 56% of the original magnitude (−5 dB) per meter of cable at our operating frequency of 2 GHz corresponding to a bit rate of 4 Gb/s. Skin effect does not begin to effect the 5 mil PC trace until 43 MHz because of its thin vertical dimension. The high DC resistance (6.8 omhs/m) of this line gives it a DC attenuation of 88% (−1.2 dB). Above 70 MHz the attenuation rolls off rapidly reaching 40% (−8 dB) at 2 GHz. The important parameter, however, is the difference between the DC and high-frequency attenuation which is 45% (−6.8 dB).

Figure 4A:
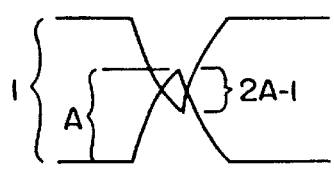
FIG. 4A illustrates respective plus and minus signals in a differential system and the reduced data eye due to attenuation.
Figure 4B:
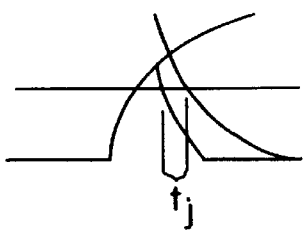
FIG. 4B illustrates trailing edge jitter.
Figure 4C:
FIG. 4C illustrates the data eye with equalization.

The effect of frequency dependent attenuation is graphically illustrated in the eye-diagrams of FIG. 4A–C. As shown in the waveform in FIG. 4A, without equalization, a high-frequency attenuation factor of A reduces the height of the eye opening to 2A-1 with the eye completely disappearing at A≦0.5. This height is the amount of effective signal swing available to tolerate other noise sources such as receiver offset, receiver sensitivity, crosstalk, reflections of previous bits, and coupled supply noise. Because the waveforms cross the receiver threshold offset from the center of the signal swing, the width of the eye is also reduced. As illustrated in FIG. 4B, the leading edge of the attenuated pulse crosses the threshold at the normal time. The trailing edge, however, is advanced by $t_j$. This data-dependent jitter causes greater sensitivity to skew and jitter in the signal or sampling clock and may introduce noise into the timing loop.

The waveform of FIG. 4C illustrates the situation when we equalize the signal by attenuating the DC and low frequency components so all components are attenuated by a factor of A. Here the height of the eye opening is A, considerably larger than 2A-1, especially for large attenuations. Also, because the waveforms cross at the midpoint of their swing, the width of the eye is a full bit-cell giving better tolerance of timing skew and jitter.

Preemphasizing Signal Transitions Equalizes Line Attenuation

Equalization eliminates the problem of frequency-dependent attenuation by filtering the transmitted or received waveform so the concatenation of the equalizing filter and the transmission line gives a flat frequency response. With equalization, an isolated 1 (0) in a field of 0s (1s) crosses the receiver threshold at the midpoint of its swing, as shown in FIG. 4C, rather than being offset by an unattenuated DC component, as shown in FIG. 4A. Narrowband voice, video, and data modems have long used equalization to compensate for the linear portion of the line characteristics (Lee, Edward A., and Messerschmitt, David G., Digital Communication, Second Edition, Kluwer, 1994). However, it has not been used to date in baseband signalling with a wide bandwidth (i.e., greater than 100 MHz) over short distances.

We equalize the line using a 4 GHz FIR filter built into the current-mode transmitter. The arrangement is similar to the use of Tomlinson preceding in a narrowband modem (Tomlinson, M., "New Automatic Equalizer Employing Modulo Arithmetic," Electronic Letters, March 1971). In a high-speed digital system it is much simpler to equalize at the transmitter than at the receiver, as is more commonly done in communication systems. Equalizing at the transmitter allows us to use a simple receiver that just samples a binary value at 4 GHz. Equalizing at the receiver would require an A/D of at least a few bits resolution or a high-speed analog delay line, both difficult circuit design problems. A discrete-time FIR equalizer is preferable to a continuous-time passive or active filter as it is more easily realized in a standard CMOS process.

Figure 5A:
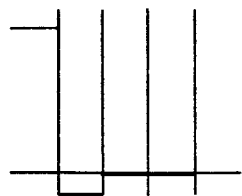
FIGS. 5A and 5B illustrate impulse response and frequency response of an equalizing filter embodying the invention.
Figure 5C:
FIGS. 5C and 5D illustrate an example input sequence and output sequence from the equalizer.
Figure 5B:
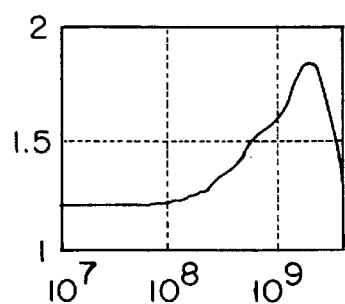

After much experimentation we have selected a five-tap FIR filter that operates at the bit rate. The weights are trained to match the filter to the frequency response of the line as described below. For a 1 m 30 AWG line, the impulse response is shown in FIG. 5A. Each vertical line delimits a time interval of one bit-cell or 250 ps. The filter has a high-pass response as shown in FIG. 5B.

Figure 6A:
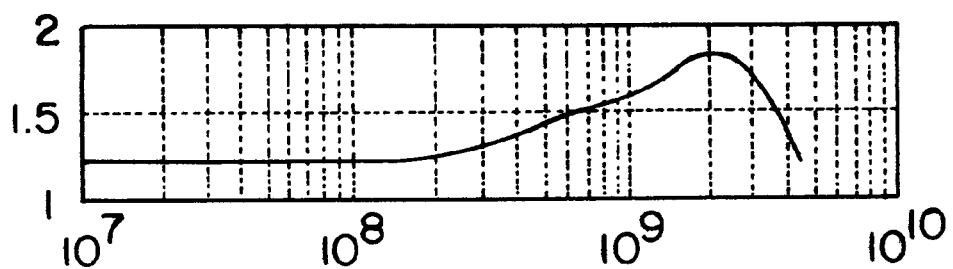
FIG. 6A illustrates the frequency response of an equalization filter embodying the invention.
Figure 6B:
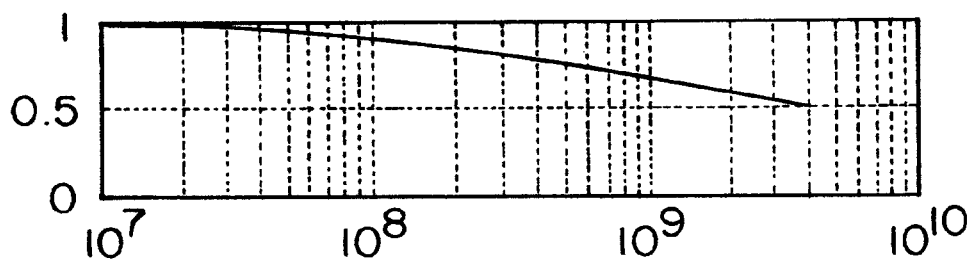
FIG. 6B illustrates transmission line attenuation.
Figure 6C:
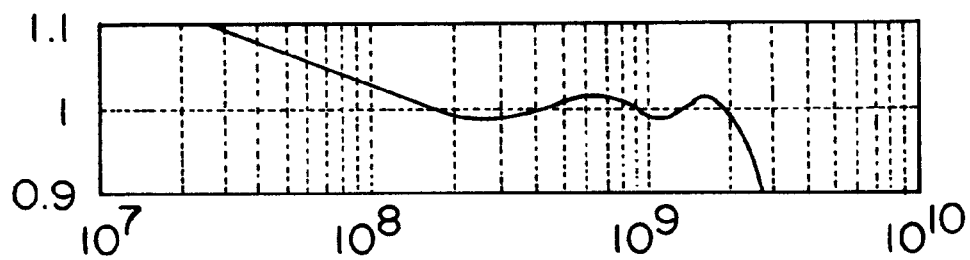
FIG. 6C illustrates the combination of equalization and line attenuation.

As shown in FIGS. 6A–C, this filter cancels the low-pass attenuation of the line giving a fairly flat response over the frequency band of interest (the decade from 200 MHz to 2 GHz). We band-limit the transmitted signal via coding to eliminate frequencies below 200 MHz. The equalization band is limited by the length of the filter. Adding taps to the filter would widen the band. We have selected five taps as a compromise between bandwidth and cost of equalization.

FIG. 6A shows the frequency response of the filter, FIG. 6B shows the frequency response of the line and FIG. 6C shows the combination (the product) for 1 m of 30 AWG cable. The scale on FIG. 6C is compressed to exaggerate the effect. The filter cancels the response of parasitics as well as the response of the line. The response is flat to within 5% across the band of interest.

Figure 5D:
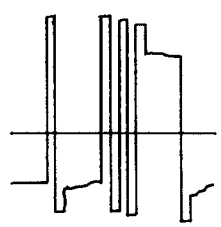

The filter results in all transitions being full-swing, while attenuating repeated bits. FIG. 5D shows the response of the filter to an example data sequence shown in FIG. 5C (0000100001010111110000). The example shows that each signal transition goes full swing with the current stepped down to an attenuated level for repeated strings of 1s (0s).

Figure 7A:
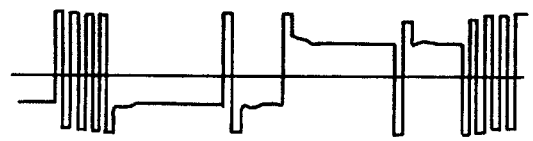
FIG. 7A illustrates an equalized transmitter signal based on the input signal of FIG. 2A.
Figure 7B:
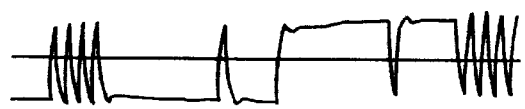
FIG. 7B illustrates the signal at the receiver resulting from the signal of FIG. 7A to be compared to FIG. 2B without equalization.

FIGS. 7A and B illustrate the application of equalization to the example of FIGS. 2A and 2B. FIG. 7A shows the filtered version of the original signal and FIG. 7B the received waveform. With equalization the isolated pulses and high-frequency segments of the signal are centered on the receiver threshold and have adequate eye openings for detection.

Circuit Implementations

Figure 8:
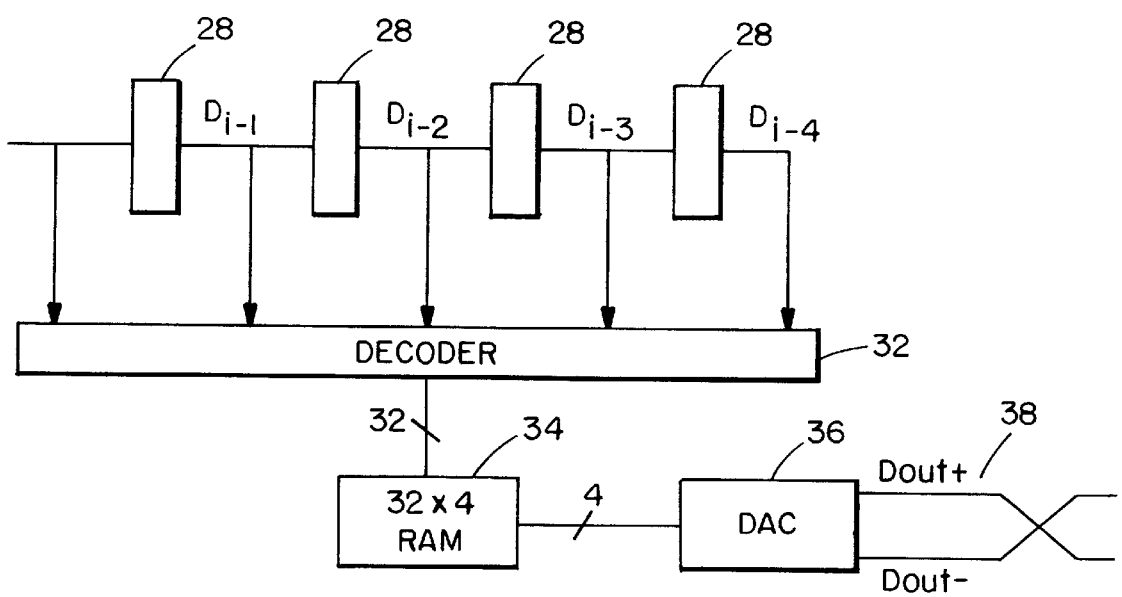
FIG. 8 illustrates one embodiment of an equalizer of the present invention including an FIR filter and digital-to-analog converter.

Preferred implementations of the invention include finite input response (FIR) filters, and FIG. 8 illustrates one such implementation. In this case, a 5 tap filter has been selected as a balance between higher fractional bandwidth and circuit complexity. With a greater number of taps, equalization can be obtained at lower frequencies. The present design provides for equalization in a range of 100 MHz to 2 GHz. By reducing to 2 or 3 taps, the lower end of the range may be no less than 500 MHz.

As in a conventional FIR filter, the input $D_i$ is delayed in successive delay elements 28. However, rather than weighting the individual delayed signals and summing the weighted signals to obtain the desired output, the delayed signals are applied to a 5-to-32 decoder 32.

One of the 32 output bits from the decoder 32 is high with any input state and that high bit addresses a 4 bit word from the 32×4 random access memory 34. The memory 34 is shown to be random access in order to allow for reprogramming of the equalization using a training process below. However, the system may be a fixed design which can be implemented using a read only memory.

The 4 bit output from RAM 34 defines one of the 15 output levels generated by a digital-to-analog converter 36 and applied to the transmission line 38. Those levels include 0, seven positive levels where Dout− is pulled low, and seven negative levels where Dout+ is pulled low.

Figure 9:
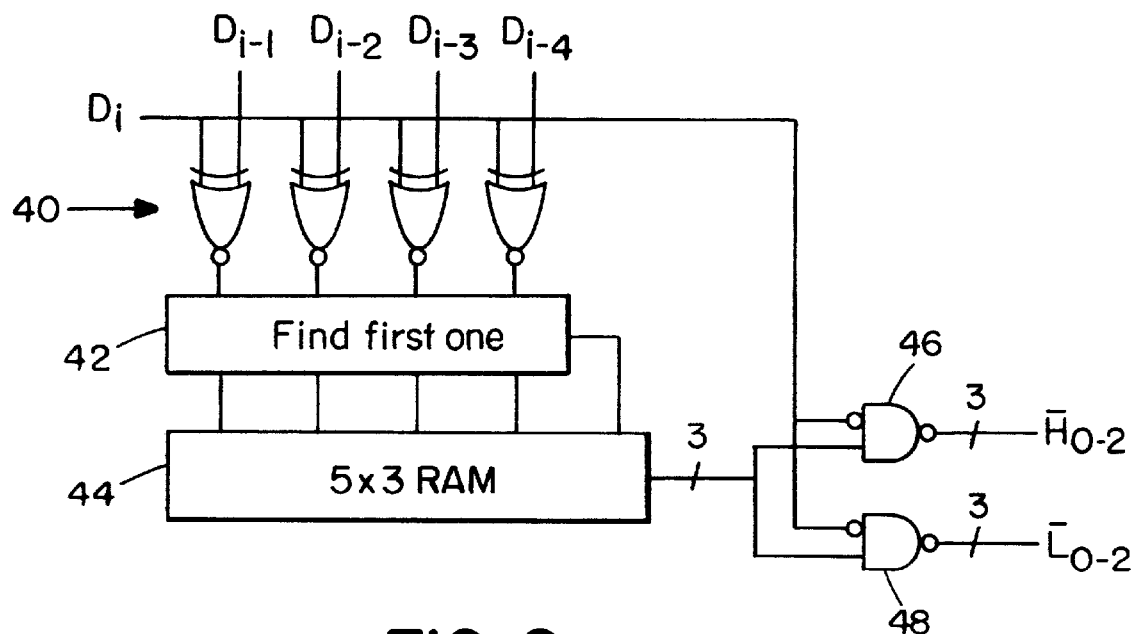
FIG. 9 illustrates a transition filter for use in a preferred embodiment of the invention.

To simplify the implementation, each FIR filter is approximated by a transition filter implemented with a look-up table as illustrated in FIG. 9. The transition filter compares, in logic elements 40, the current data bit $D_i$ to each of the last four bits, and uses a find-first-one unit 42 to determine the number of bits since the last signal transition. The result is used to look up a 3-bit drive strength for the current bit from a 15-bit serially-loaded RAM 44. The drive strength is multiplied by the current bit with two sets of three NAND gates 46, 48 to generate three-bit high and low drive signals for the DAC.

While the transition filter is a non-linear element, it closely approximates the response of an FIR filter for the impulse functions needed to equalize typical transmission lines. Making this approximation greatly reduces the size and delay of the filter as a 96-bit RAM would be required to implement a full 5-tap FIR filter via a lookup table and the gates 46 and 48.

Figure 10:
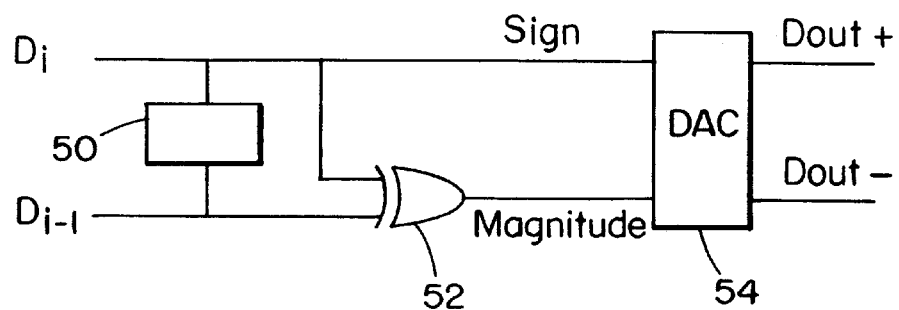
FIG. 10 illustrates a two tap transition filter embodying the invention.

The transition filter can be simplified even further to the simple logic circuit of FIG. 10 which operates as a two tap filter. The input signal $D_i$ is delayed in a single delay element 50 to produce the signal $D_{i-1}$. The two signals are combined in an exclusive-OR gate 52 to determine whether the current bit is equal to the immediately previous bit. If so, the lower magnitude output is generated by the digital-to-analog converter 54. If, on the other hand, there has been a transition since the previous bit, the output is emphasized. Thus, this simple circuit provides four output levels, two positive and two negative.

In yet another two-tap embodiment, with a transition, full current drive is used in opposite directions on both sides of the transition. When the signal value remains unchanged, an attenuated current drive is used.

Figure 11A:
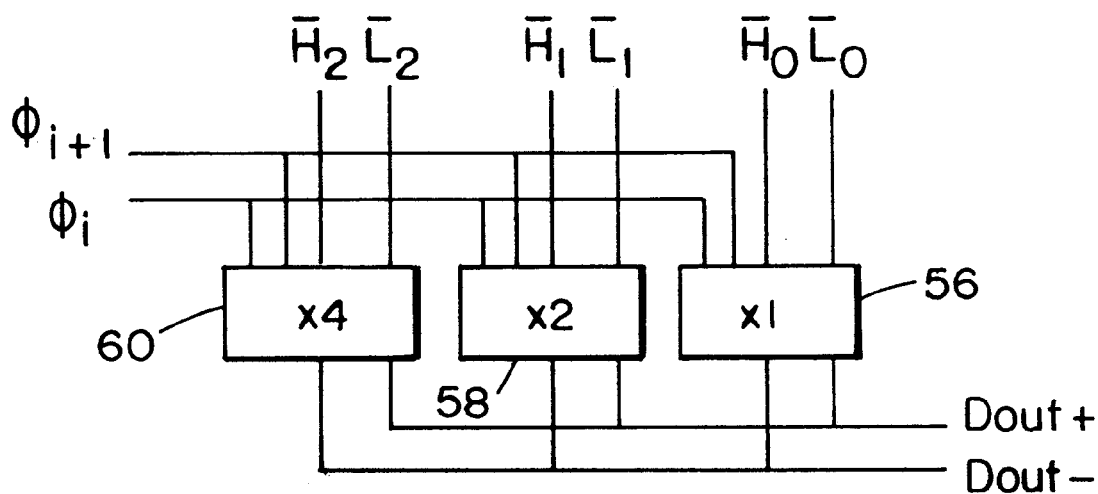
FIGS. 11A and 11B illustrate a digital to analog converter for use in the present invention.

The circuit design of the DAC used in the FIG. 9 embodiment is shown in FIGS. 11A and B. As shown in FIG. 11A, each DAC module is composed of three progressively sized differential pulse generators 56, 58 and 60. Each generator is enabled to produce a current pulse on Dout+ (Dout−) if the corresponding H (L) line is low. If neither line is low no pulse is produced. Depending on the current bit and the three-bit value read from the RAM 44 in the filter module, 15 different current values are possible (nominally from −8.75 mA to +8.75 ma in 1.25 mA steps). The timing of the pulse is controlled by a pair of clocks. A low-going on-clock $\phi_i$ gates the pulse on its falling edge. The high-true off clock $\phi_{i+1}$ gates the pulse off 250 ps later.

Figure 11B:
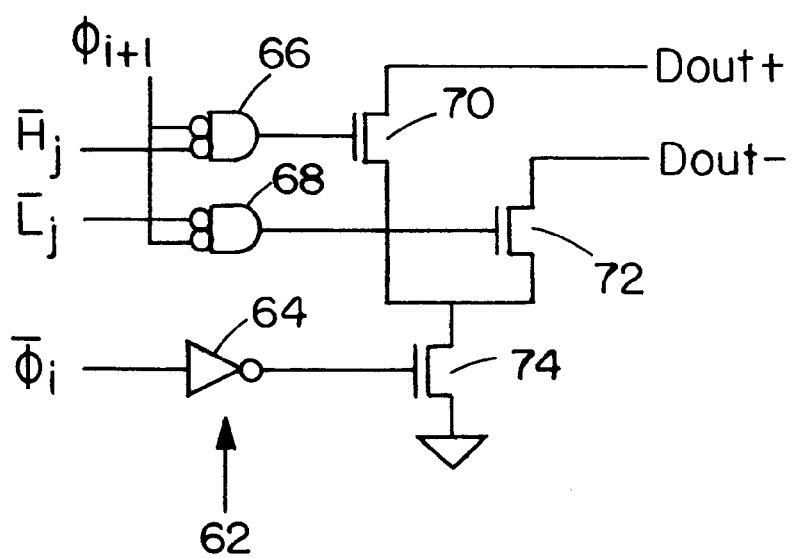

Each of the three differential pulse generators is implemented as shown in FIG. 11B. A pre-drive stage 62 inverts the on-clock in inverter 64 and qualifies the off-clock with the enable signals in NOR gates 66 and 68. A low (true) enable signal, which must be stable while the off-clock is low, turns on one of the two output transistors 70, 72, priming the circuit for the arrival of the on-clock. When the on-clock falls, the common tail transistor 74 is turned on, starting the current pulse. When the off-clock rises, the selected output transistor terminates the current pulse. The delay of the qualifying NOR-gate is carefully matched against that of the on-clock inverter to avoid distorting the pulse width.

To enable operation of the equalization circuit at rates in the order of gigahertz while using circuitry operating only in the order of hundreds of megahertz, the preferred embodiment generates the signal levels by multiplexing outputs of parallel logic circuits operating on different multiple bit inputs.

Figure 12:
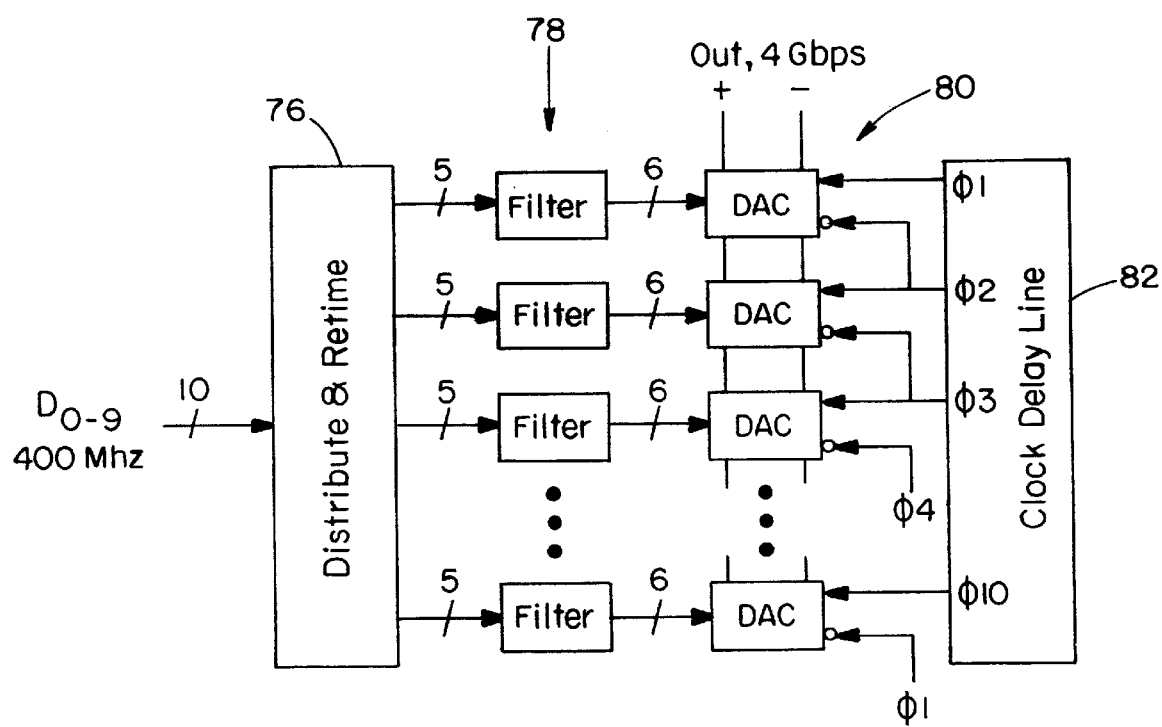
FIG. 12 illustrates a preferred multiplexed embodiment of the invention.

A block diagram of the multiplexed transmitter is shown in FIG. 12. The transmitter accepts 10 bits of data, $D_{0-9}$, at 400 MHz. A distribution block 76 delivers 5 bits of data to each of 10 FIR filters 78. The ith filter receives bit $D_i$ and the four previous bits. For the first four filters this involves delaying bits from the previous clock cycle. The distribution also retimes the filter inputs to the clock domain of the filter. Each filter 78 is a 5-tap transition filter that produces a 4-bit output encoded as 3 bits of positive drive and 3 bits of negative drive. These six bits from the filter directly select which of six pulse generators in the DAC 80 connected to that filter are enabled. The enabled pulse generators are sequenced by the 10-phase clock 82. The ith pulse generator is gated on by $\phi_i$ and gated off by $\phi_{i+1}$. To meet the timing requirements of the pulse generator, the ith filter operates off of clock $\phi_{i+1}$.

A training sequence may be used to initialize the transmitter pre-emphasis filter at powerup. Training is performed under the control of a supervisory processor 26 that interfaces with the transmitter on one end of the line and the receiver on the other end via a low-speed serial scan chain. A preliminary version of a training sequence for one channel is as follows:

1. The frequency response of the line is measured. The transmitter is commanded to turn off precompensation and send an alternating sequence of 1s and 0s. The receiver measures the level of the received signal by using a feedback transmitter to shift the DC operating point of the sense-amplifiers. The process is repeated at other bit rates to trace out the attenuation curve. For example, bit rates of $R_{max}$, $R_{max}/2$, $R_{max}/3$ . . . may be tested.
2. Based on the attenuation measurements taken in (1), the transmitter equalization is set by programming the FIR filter and/or DAC.

CONCLUSION

Transmitter equalization extends the data rates and distances over which electronic digital signalling can be reliably used. Preemphasizing the high-frequency components of the signal compensates for the low-pass frequency response of the package and transmission line. This prevents the unattenuated low-frequency components from interfering with high-frequency pulses by causing offsets that prevent detection. With equalization an isolated pulse at the receiver has the same amplitude as a long string of repeated bits. This gives a clean received signal with a good eye opening in both the time and voltage dimensions.

In one embodiment, we implement equalization for a 4 Gbs signalling system by building a 4 GHz, five-tap FIR filter into the transmitter. This filter is simple to implement yet equalizes the frequency response to within 5% across the band of interest. The filter is realized using 0.5 Mm CMOS circuitry operating at 400 MHz using a bank of 10 filters and DACs sequenced by a 10-phase 400 MHz clock. Narrow drive periods are realized using series gating to combine two clock phases, an on-phase and off-phase, in each DAC. We have simulated extracted layout of the equalized transmitter driving a load through package parasitics and 1 m of differential strip guide to demonstrate the feasibility of this approach.

The equalizing transmitter described here is one component of a 4 Gbs signalling system we are currently developing for implementation in an 0.5 $\mu$m CMOS technology. The system also relies on low-jitter timing circuitry, automatic per-line skew compensation, a narrow-aperture receive amplifier, and careful package design.

The availability of 4 Gbs serial channels in a commodity CMOS technology will enable a range of system opportunities. The ubiquitous system bus can be replaced by a lower-cost yet higher-speed point-to-point network. A single hub chip with 32 serial ports can directly provide the interconnection for most systems and can be assembled into more sophisticated networks for larger systems. A single 4 Gbs serial channel provides adequate bandwidth for most system components and multiple channels can be ganged in parallel for higher bandwidths.

A 4 Gbs serial channel can also be used as a replacement technology at both the component and system level. At the component level, a single serial channel (two pins) replaces 40 100 MHz pins. A 4 GByte/s CPU to L2 cache interface, for example, could be implemented with just eight serial channels. At the system level, high-speed electrical serial channels are a direct replacement for expensive optical interconnect. Using 18 AWG wire, these channels will operate up to lengths of 10 m enabling high-bandwidth, low-cost peripheral connections and local-area networks. Inexpensive electrical repeaters can be used to operate over substantially longer distances.

Even with 4 Gbs channels, system bandwidth remains a major problem for system designers. On-chip logic bandwidth (gates×speed) is increasing at a rate of 90% per year (60% gates and 20% speed). The density and bandwidth of system interconnect is increasing at a much slower rate of about 20% per year as they are limited by mechanical factors that are on a slower growth curve than that of semiconductor lithography. A major challenge for designers is to use scarce system interconnect resources effectively, both through the design of sophisticated signalling systems that use all available wire bandwidth and through system architectures that exploit locality to reduce the demands on this bandwidth.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A communication system comprising:
    a digital transmitter;
    a signal channel which receives signals from the transmitter;
    a digital receiver which detects signals from the signal channel; and
    an equalizer which generates signal levels as a logical function of bit history to emphasize transition signal levels relative to repeated signal levels, the equalizer generating the signal levels by applying different bits of a multiple bit input to parallel digital filter circuits and multiplexing outputs of the parallel digital filter circuits to provide a combined equalized output at a rate greater than the rate from each digital filter circuit.

2. A communication system as claimed in claim 1 wherein the equalizer is in the transmitter.

3. A communication system as claimed in claim 1 wherein the equalizer converts an input signal having discrete signal levels at an input data rate to an output signal having a greater number of discrete signal levels at the input data rate.

4. A communication system as claimed in claim 1 wherein the signals are baseband signals with a bandwidth of at least 100 MHz.

5. A communication system as claimed in claim 1 wherein the transmitter and receiver are within a common cabinet.

6. A communication system as claimed in claim 1 wherein the transmitter and receiver are on a common local area network.

7. A communication system as claimed in claim 1 wherein the logical function is defined by a lookup table.

8. A communication system as claimed in claim 1 wherein the logical function is based on time since last signal transition.

9. A communication system as claimed in claim 8 wherein the logical function is based on whether a current bit is equal to an immediately previous bit.

10. A communication system as claimed in claim 1 wherein the equalizer is in the transmitter and is adapted to modify level of equalization as a function of signals detected at the receiver.

11. A communication system as claimed in claim 1 wherein the logical function is a function of a current bit and an immediately previous bit.

12. A communication system as claimed in claim 1 wherein the equalizer drives full current in opposite directions on both sides of a transition and drives an attenuated current when a signal value remains unchanged.

13. A digital transmitter comprising an equalizer which emphasizes transition signal levels relative to repeated signal levels, the equalizer comprising:
   parallel digital filter circuits operating on different multiple bit portions of a multiple bit input; and
   a multiplexing circuit which multiplexes outputs of the parallel circuits to provide a combined equalized output at a rate greater than the rate from each digital filter circuit, the equalizer generating signal levels as a logical function of bit history.

14. A digital transmitter as claimed in claim 13 wherein the logical function is defined by a lookup table.

15. A digital transmitter as claimed in claim 13 wherein the logical function is based on time since last signal transition.

16. A digital transmitter as claimed in claim 15 wherein the logical function is based on whether a current bit is equal to an immediately previous bit.

17. A digital transmitter comprising an equalizer which emphasizes transition signal levels relative to repeated signal levels, the equalizer comprising:
   parallel digital filter circuits operating on different multiple bit portions of a multiple bit input; and
   a multiplexing circuit which multiplexes outputs of the parallel circuits to provide a combined equalized output at a rate greater than the rate from each digital filter circuit, the equalizer generating signal levels as a logical function of a current bit and an immediately previous bit.

18. A communication method comprising:
   transmitting a digital signal on a communication channel; and
   equalizing the digital signal as a logical function of bit history to emphasize transition signal levels relative to respected signal levels by multiplexing outputs of parallel digital filter circuits operating on different multiple bit portions of a multiple bit input to provide a combined equalized output at a rate greater than the rate from each digital filter circuit.

19. A method as claimed in claim 18 wherein an input digital signal has discrete signal levels at an input data rate and the equalized signal has a greater number of discrete signal levels at the input data rate.

20. A method as claimed in claim 18 wherein the signals are baseband signals with a bandwidth of at least 100 MHz.

21. A method as claimed in claim 18 wherein the digital signal is transmitted to a receiver within a common cabinet.

22. A method as claimed in claim 18 wherein the digital signal is transmitted to a receiver on a local area network.

23. A method as claimed in claim 18 wherein the logical function is defined by a lookup table.

24. A method as claimed in claim 18 wherein the logical function is based on time since last signal transition.

25. A method as claimed in claim 24 wherein the logical function is based on whether a current bit is equal to an immediately previous bit.

26. A method as claimed in claim 18 wherein equalization of the output signal performed in a transmitter and is adapted as a function of signals detected at a receiver.

27. A method as claimed in claim 18 wherein the logical function is a function of a current bit and an immediately previous bit.

28. A method as claimed in claim 18 wherein the step of equalizing comprises driving full current in opposite directions on both sides of a transition and driving an attenuated current when a signal value remains unchanged.

29. A method of communications comprising generating a digital signal and equalizing the digital signal in a transmitter by emphasizing transition signal levels relative to repeated signal levels comprising:
   operating on different multiple bit inputs in parallel digital filter circuits;
   multiplexing outputs of the parallel filter circuits to provide a combined equalized output at a rate greater than the rate from each digital filter circuit, the digital signal being equalized as a logical function of bit history.

30. A method as claimed in claim 29 wherein the logical function is defined by a lookup table.

31. A method as claimed in claim 29 wherein the logical function is based on time since last signal transition.

32. A method as claimed in claim 31 wherein the logical function is based on whether a current bit is equal to an immediately previous bit.

33. A method of communications comprising generating a digital signal and equalizing the digital signal in a transmitter by emphasizing transition signal levels relative to repeated signal levels comprising:
   operating on different multiple bit inputs in parallel digital filter circuits;
   multiplexing outputs of the parallel filter circuits to provide a combined equalized output at a rate greater than the rate from each digital filter circuit, the digital signal being equalized as a logical function of a current bit and an immediately previous bit.

34. A communication system comprising:

a digital transmitter which transmits baseband signals with a bandwidth of at least 100 MHz;

a signal channel which receives signals from the transmitter;

a digital receiver which detects signals from the signal channel; and an equalizer in the transmitter which generates signal levels as a logical function of bit history based on time since last signal transition to emphasize transition signal levels relative to repeated signal levels, the equalizer converting an input signal having discrete signal levels at an input data rate to an output signal having a greater number of discrete signal levels at the input data rate, the equalizer generating the signal levels by multiplexing outputs of parallel digital filter circuits operating on different multiple bit portions of the input signal to provide a combined equalized output at a rate greater than the rate from each digital filter circuit.

35. A communication system as claimed in claim 34 wherein the equalizer drives full current in opposite directions on both sides of a transition and drives an attenuated current when a signal value remains unchanged.

36. A method of digital communications comprising transmitting digital signals from a transmitter to a receiver on a signal channel, the method further comprising equalizing input baseband signals with a bandwidth of at least 100 MHz, the input signals having discrete signal levels at an input data rate and being transmitted as output signals having a greater number of discrete signal levels at the input data rate, the equalizer generating signal levels as a logical function of bit history to emphasize transition signal levels relative to repeated signal levels based on time since last signal transition, the equalizer generating the signal levels by multiplexing outputs of parallel logic circuits operating on different multiple bit inputs.

37. A method as claimed in claim 36 wherein the equalizer drives full current in opposite directions on both sides of a transition and drives an attenuated current when a signal value remains unchanged.

38. A digital transmitter comprising an equalizer which emphasizes transition signal levels relative to repeated signal levels, the equalizer comprising:

parallel digital filter circuits operating on different multiple bit portions of a multiple bit input; and a multiplexing circuit which multiplexes outputs of the parallel circuits to provide a combined equalized output at a rate greater than the rate from each digital filter circuit, the equalizer driving full current in opposite directions on both sides of a transition and driving an attenuated current when a signal value remains unchanged.

39. A method of communications comprising generating a digital signal and equalizing the digital signal in a transmitter by emphasizing transition signal levels relative to repeated signal levels comprising:

operating on different multiple bit inputs in parallel digital filter circuits;

multiplexing outputs of the parallel filter circuits to provide a combined equalized output at a rate greater than the rate from each digital filter circuit, the transition signal levels being emphasized by driving the full current in opposite directions on both sides of the transition and driving an attenuated current when a signal value remains unchanged.

40. A digital transmitter comprising an equalizer which generates output signal levels, the equalizer comprising:

parallel digital filter circuits operating on different multiple bit portions of a multiple bit input; and a multiplexing circuit which multiplexes outputs of the parallel digital filter circuits to provide a combined equalized output at a rate greater than the rate from each digital filter circuit, the equalizer driving full current in opposite directions on both sides of a transition and driving an attenuated current when a signal value remains unchanged.

41. A digital transmitter comprising an equalizer which emphasizes transition signal levels relative to repeated signal levels, the equalizer converting an input baseband signal with a bandwidth of at least 100 MHz at an input data rate to an output signal having a greater number of discrete signal levels at the input data rate, equalization being based on time since last signal transition, the equalizer generating signal levels by multiplexing outputs of parallel logic circuits operating on different multiple bit inputs, the equalizer driving full current in opposite directions on both sides of a transition and driving an attenuated current when a signal value remains unchanged.

* * * * *

UNITED STATES PATENT AND TRADEMARK OFFICE
CERTIFICATE OF CORRECTION

PATENT NO.      : 6,266,379 B1                                          Page 1 of 1
APPLICATION NO. : 08/882252
DATED           : July 24, 2001
INVENTOR(S)     : William J. Dally It is certified that error appears in the above-identified patent and that said Letters Patent is hereby corrected as shown below:

In the drawings, sheet 6, Fig. 9, the inverting bubble at the input of Gate 46 in Fig. 9 has been deleted: please replace Fig. 9 with attached Fig. 9 below.

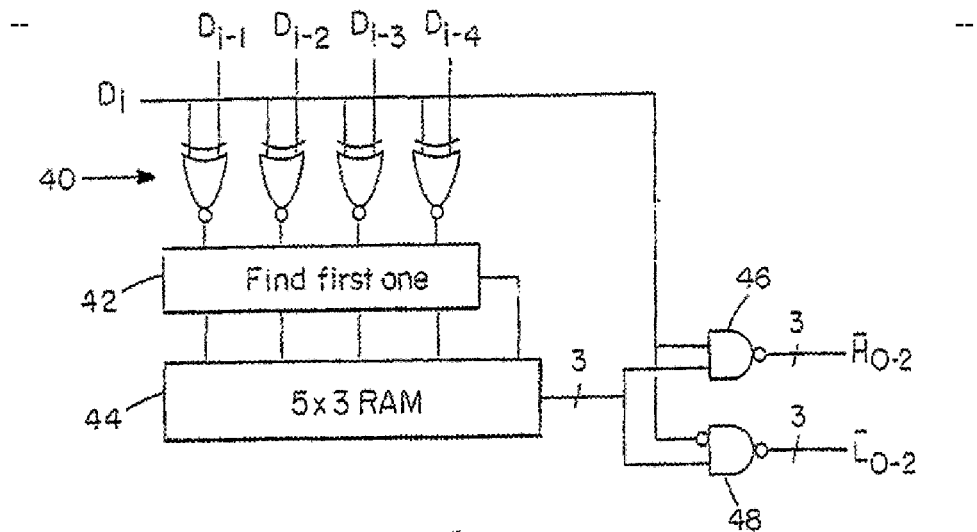

FIG. 9

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,266,379 B1 | Page 1 of 1 |
| APPLICATION NO. | : 08/882252 | |
| DATED | : July 24, 2001 | |
| INVENTOR(S) | : Dally | |

It is certified that error appears in the above-identified patent and that said Letters Patent is hereby corrected as shown below:

In the Specification

Col. 1, lines 14-17 should read - "This invention was made with Government support under Contact No. F19628-92-C-0045 awarded by the U.S. Air Force. The Government has certain rights in the invention."

Signed and Sealed this
Twenty-ninth Day of March, 2016

Michelle K. Lee
*Director of the United States Patent and Trademark Office*